UNITED STATES PATENT OFFICE.

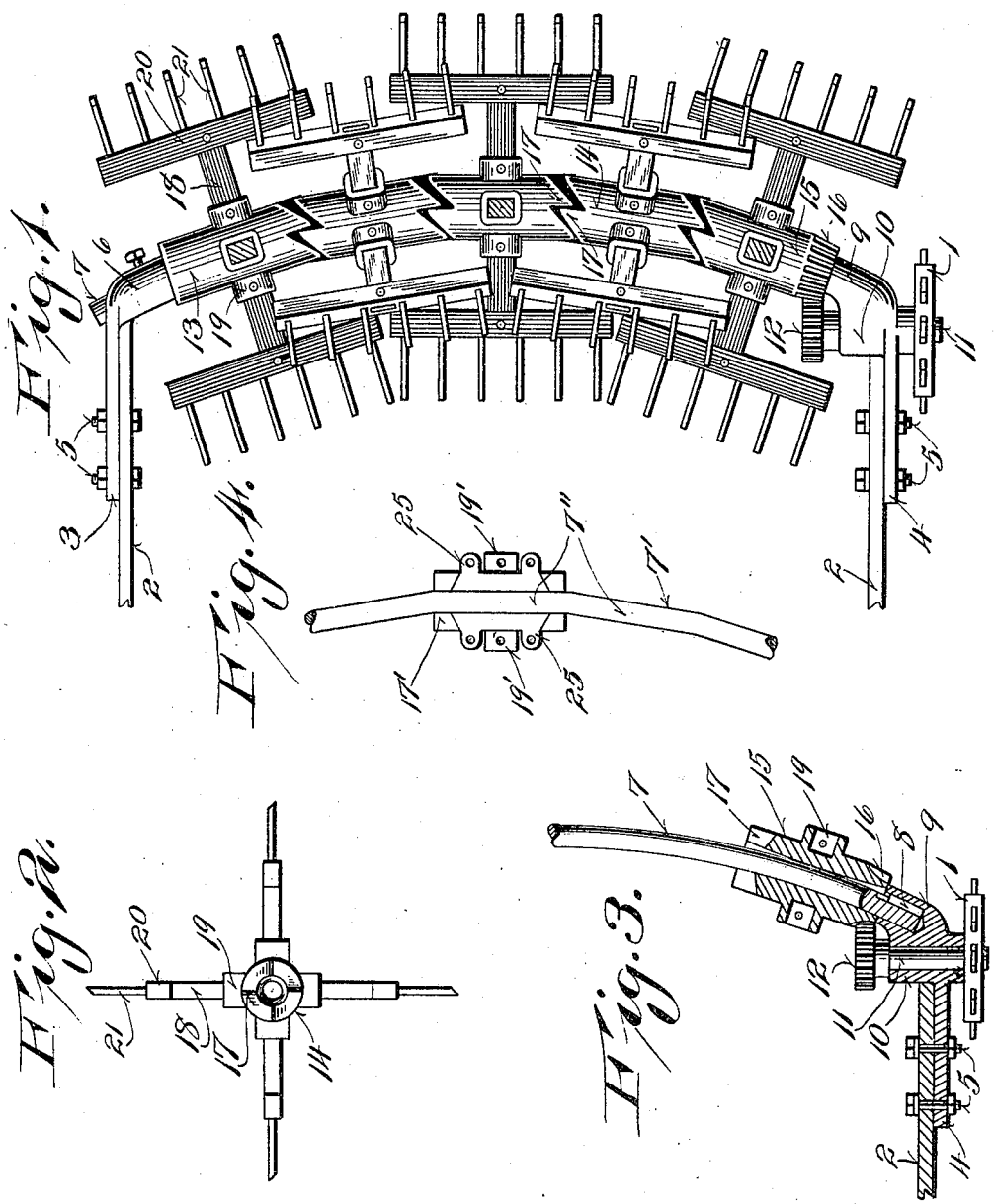

HANS AAMODT, OF STOUGHTON, WISCONSIN.

MANURE-SPREADER.

1,326,163.  Specification of Letters Patent.  Patented Dec. 30, 1919.

Application filed June 4, 1919. Serial No. 301,844.

*To all whom it may concern:*

Be it known that I, HANS AAMODT, a subject of the King of Norway, but who has declared his intention of becoming a citizen of the United States, and resident of Stoughton, in the county of Dane and State of Wisconsin, have invented certain new and useful Improvements in Manure-Spreaders; and I do hereby declare that the following is a full, clear, and exact description thereof.

My invention relates to new and useful improvments in manure spreaders, and particularly to the beaters or distributers used thereon.

The principal object of this invention is to provide a manure spreader having means for distributing the manure or the like over a greater area of ground than is possible with spreaders of standard design. In carrying out the invention the beater is so constructed that upon rotation it will throw the manure from the rear end of the spreader so that a fan-shaped area of ground will be covered.

A further object of the invention is to provide a simply constructed beater formed of a plurality of sections, each of which is so connected together that rotation of one of the sections will simultaneously rotate all of the others.

With these general objects in view, the invention consists in certain novel features of construction, combination and arrangement of parts which will be hereinafter more particularly described and claimed and shown in the drawing, in which, Figure 1 represents a plan view of a beater or distributer constructed in accordance with my invention.

Fig. 2 is an end view of one of the sections comprising the invention.

Fig. 3 is a detail horizontal sectional view taken through one end portion of the beater and the driving means therefor.

Fig. 4 is a plan view of a fragment of the supporting rod of a modified form of the invention having a portion of one of the spreader element shaft sections disposed thereon.

The invention is adapted to be mounted upon the rear end of a manure spreader body for coöperation with the usual bottom conveyer apron and is driven through a sprocket 1 connected to any preferred driven part of the spreader. In the accompanying drawing the sides of the spreader body are indicated generally by the numeral 2, the rear end of each of which sides has a bracket 3 or 4 secured thereto as at 5.

Referring more particularly to Figs. 1, 2 and 3, it will be seen that the outer end of the bracket 3 has a sleeve 6 receiving one end of a curved, or outwardly bowed, supporting rod 7, the other end of the latter being keyed as at 8 in a socket 9 on the other bracket 4. The last mentioned bracket also includes a bearing 10 in which a stub shaft 11 is journaled, the outer end of this shaft having said sprocket 1 secured thereto, while the inner end mounts a pinion 12.

Rotatably mounted on the supporting rod 7 between the sleeve 6 and the socket 9 is a plurality of hollow shaft sections 13, 14 and 15. The outermost sections 13 and 15 have their outer ends flat for engagement with the adjacent ends of the sleeve and socket 6 and 9 respectively, but the section 15 also has its periphery adjacent said end provided with gear teeth 16 for meshing engagement with the teeth of the pinion 12. The inner ends of the sections 13 and 15 and both ends of the several inner sections 14 are provided with ratchet-like clutch teeth 17.

The sections 13, 14 and 15 are thus all connected so that when the section 15 is rotated in one direction, all of the other sections will be simultaneously and similarly rotated. This construction in effect is a flexible shaft, and the same is readily rotated regardless of the curvature of the supporting rod 7. By slightly varying the size and shape of the teeth 17 so that the sections will always be more or less in engagement, supporting rods curved different amounts may be substituted for the one shown.

Each of the shaft sections 13, 14 and 15 carries a plurality of spreader elements, four being shown, each of which comprises a radially extending arm 18 seated in a socket 19 formed on its section, a head 20 carried by the outer end of the arm 18 and extended laterally thereto, and a plurality of teeth 21 projecting from the head. The spreader elements carried by one of the shaft sections are staggered with respect to the elements on the adjacent sections so that interference therebetween is prevented during the rotation of the several shaft sections.

Owing to the curvature of the supporting rod 7 and the flexible nature of the shaft comprising the shaft sections, the several arms 18 of the spreader elements, and consequently the toothed heads carried thereby, will be continuously moved toward and away from each other. For instance the spreader elements which are disposed inwardly of the supporting shaft 7 are closely grouped, whereas the outwardly extending elements are relatively spread apart; the spreader elements located between the inner and outermost sets assume different positions and are neither so grouped nor so far apart as the others. As a result of this the endmost spreader elements when positioned outwardly of the supporting rod are diverged, and the toothed heads carried thereby will throw the manure or the like, which they have received when passing within the spreader body, outwardly and diagonally to the direction of movement of the spreader. The spreader elements next adjacent these outermost elements will distribute the manure which they pick up in somewhat the same manner but being located closer to the longitudinal center of the spreader will not throw so far as the endmost elements; the central elements distribute their material directly to the rear of the spreader body so that all ground for a considerable distance to the rear of the spreader body and on each side thereof will be thoroughly covered with manure. In other words the ground area covered is substantially fan-shaped. It will be noted that the heads 20 are preferably in the form of bars which are disposed longitudinally of the axes of the hubs 13, and that since they are longer than the hubs their end portions are disposed in overlapping relation. Such relation continues throughout the complete cycle of operations of the heads, and this will eliminate any possibility of any part of the ground, within the limits of the spreading action of the invention, not being completely covered by the manure or other material to be operated upon.

In Fig. 4 is shown a second manner in which the supporting rod may be formed, this particular rod 7' being angularly bent instead of curved to provide a plurality of seats 7'', on each of which a shaft section is journaled. Each of the shaft sections in this case is formed of two halves secured together by bolts or the like which extend through ears 25. The ends of each half of the section are provided with teeth 17' used for the same purpose as the teeth 17 shown in the other figures of the drawing. The arms of the spreader elements are secured to the parts 19' which correspond with the sockets 19.

It will be obvious from the foregoing description taken in connection with the accompanying drawing that a certain piece of ground can be more quickly manured with a spreader equipped with my invention in which the beater or distributer is bowed, than by means of a standard spreader having an ordinary cylindrical beater. The length and curvature of the beater may be readily varied by increasing or decreasing the number of shaft sections and by changing the curve of the supporting rod. Other changes may also be made in the form and proportion and in the general details of construction without departing from or sacrificing any of the principles of the invention.

I claim:

1. A spreader of the class described comprising a supporting shaft, a plurality of bearing hubs rotatable on said shaft, said hubs being loosely connected for simultaneous operation, a plurality of radially extending arms on each of said hubs, the arms of one hub being staggered with respect to those of the adjacent hubs, and a head on each of said arms, said heads being disposed lengthwise of the shaft with their longitudinal planes substantially parallel with the axes of their respective hubs, the ends of the adjacent heads being continuously in overlapped relation throughout their cycle of operations, whereby every part of the surface to be treated will be covered by the material operated upon by the spreader.

2. A spreader of the class described comprising a supporting shaft, a plurality of bearing hubs rotatable on said shaft, said hubs being loosely connected for simultaneous operation, a plurality of radially extending arms on each of said hubs, the arms of one hub being staggered with respect to those of the adjacent hubs, each of said heads being longer than its supporting hub and disposed lengthwise of the shaft, the longitudinal planes of the heads being substantially parallel with the axes of their respective hubs, the length of the heads causing the end portions of the same to be disposed in overlapping relation throughout their cycle of operations, whereby every part of the surface to be treated will be covered by the material operated upon by the spreader.

3. A spreader of the class described comprising an arcuate supporting shaft, a plurality of bearing hubs rotatable on said shaft, said hubs being loosely connected for simultaneous operation, a plurality of radially extending arms on each of said hubs, the arms of one hub being staggered with respect to those of the adjacent hubs, and a head on each of said arms, said heads being disposed lengthwise of the shaft with their longitudinal planes substantially parallel with the axes of their respective hubs, the ends of the adjacent heads being continuously in overlapped relation throughout their cycle of operations, whereby every part of the surface to be treated will be covered by the material operated upon by the spreader.

In testimony that I claim the foregoing I have hereunto set my hand at Stoughton, in the county of Dane, and State of Wisconsin.

HANS AAMODT.